United States Patent [19]

Mizuno et al.

[11] Patent Number: 5,077,884
[45] Date of Patent: Jan. 7, 1992

[54] APPARATUS FOR MANUFACTURING SLIDE FASTENERS

[75] Inventors: Hiroshi Mizuno; Kazuki Kuse, both of Toyama; Shunji Akashi; Hiroshi Yoshida, both of Kurobe; Yozo Okada, Toyama; Tatsuo Ito, Kurobe, all of Japan

[73] Assignee: Yoshida Kogyo K.K., Tokyo, Japan

[21] Appl. No.: 550,078

[22] Filed: Jul. 9, 1990

[30] Foreign Application Priority Data

| Jul. 15, 1989 [JP] | Japan | 1-183069 |
| Jul. 26, 1989 [JP] | Japan | 1-193707 |
| Sep. 12, 1989 [JP] | Japan | 1-235954 |

[51] Int. Cl.$^5$ .................... B21D 53/50; A41H 37/06
[52] U.S. Cl. .................... 29/408; 29/766; 29/767; 29/768
[58] Field of Search ............ 29/408, 409, 410, 766, 29/767, 768, 33.2

[56] References Cited

U.S. PATENT DOCUMENTS

| 2,754,908 | 7/1956 | Proud. | |
| 3,190,521 | 6/1965 | Perlman. | |
| 3,446,009 | 5/1969 | Cane et al. | |
| 3,530,563 | 9/1970 | Maeda | 29/207.5 |
| 3,626,579 | 12/1971 | Maeda | 29/408 |
| 3,644,981 | 2/1972 | Gustavsson | 29/207.5 SL |
| 3,714,698 | 2/1973 | Fukuroi | 29/408 |
| 3,815,208 | 6/1974 | Kawakami. | |
| 4,265,014 | 5/1981 | Yoshieda et al. | 29/766 |
| 4,489,873 | 12/1984 | Yoshida et al. | 226/162 |
| 4,821,396 | 4/1989 | Yoshieda et al. | 29/410 |
| 4,835,845 | 6/1989 | Sassa | 29/767 |
| 4,845,829 | 7/1989 | Sassa | 29/409 |
| 4,932,113 | 6/1990 | Frohlich et al. | 29/409 |

FOREIGN PATENT DOCUMENTS

| 0147771 | 7/1985 | European Pat. Off. . |
| 0177946 | 4/1986 | European Pat. Off. . |
| 1913873 | 10/1970 | Fed. Rep. of Germany . |
| 1530923 | 6/1968 | France . |
| 2185369 | 1/1974 | France . |
| 2634990 | 2/1990 | France . |
| 39-19216 | 9/1964 | Japan . |
| 42-16835 | 9/1967 | Japan . |
| 59-22900 | 7/1984 | Japan . |
| 1610456 | 11/1970 | United Kingdom . |
| 2119436 | 11/1983 | United Kingdom . |

Primary Examiner—P. W. Echols
Attorney, Agent, or Firm—Hill, Van Santen, Steadman & Simpson

[57] ABSTRACT

A method of and apparatus for manufacturing slide fasteners of selected product lengths from an elongate continuous stringer chain, the method comprising selecting predetermined fastener component parts from among a plurality of such respective component parts which differ in type, form, material and color, feeding and applying the selected parts one at a time to the stringer chain. The apparatus reducing the method to practice comprises operating units arranged to selectively feed and apply the component parts under computer program control.

6 Claims, 19 Drawing Sheets

5,077,884

APPARATUS FOR MANUFACTURING SLIDE FASTENERS

BACKGROUND OF THE INVENTION

1. Field of the Invention

This invention relates generally to the manufacture of slide fastener products from an elongate continuous stringer chain and more particularly to a method of and an apparatus for manufacturing slide fasteners in which their component parts are selectively applied.

2. Prior Art

There are known methods of making slide fasteners from a continuous length chain of stringers to which various component parts are applied in a continuous cycle of operation. Typical examples of such methods are disclosed for example in Japanese Patent Publication No. 39-19216 and Japanese Laid-Open Disclosure No. 64-37903. When assembling slide fasteners with component parts varying in type, material, color and other characteristics, it was necessary to use separate apparatus each time assigned to the assembling of specific like component parts, or alternatively to modify the manufacturing systems to enable the feeding and attachment of fastener component parts of different characteristics. These procedures are indeed tedious and economically infeasible particularly where a wide variety of slide fasteners are to be manufactured in relatively small lots.

SUMMARY OF THE INVENTION

With the foregoing difficulties in view, the present invention seeks to provide a method of manufacturing slide fasteners from a continuous single stringer chain of multiple interconnected stringers in which component parts of different types, forms, materials or colors are selectively fed and attached to the chain in a continuous integrated cycle of operation and in which slide fasteners are available with optional product lengths.

The invention further seeks to provide an apparatus for reducing the above method to practice.

These and other objects and features of the invention will appear clear from the following detailed description taken in conjunction with the accompanying drawings.

According to one aspect of the invention, there is provided a method of manufacturing slide fasteners which comprises the steps of: (a) gapping an elongate continuous stringer chain to provide element-free space portions at predetermined intervals therealong, (b) selecting a predetermined bottom end stop member from among a plurality of bottom end stop members differing in type, form, material or color and attaching the same to the stringer chain, (c) selecting a predetermined slider from among a plurality of sliders differing in type, form, material or color and attaching the same to the stringer chain, (d) attaching a top end stop member to the stringer chain and (e) cutting the stringer chain centrally across the element-free space portions into individual slide fastener products.

According to another aspect of the invention, there is provided a method of manufacturing slide fasteners which comprises the steps of: (a) interconnecting a plurality of stringer chains of predetermined lengths differing in type, form, material or color and providing the stringer chains with marking means at their interconnected junctions, (b) gapping the stringer chains to provide element-free space portions at predetermined intervals therealong, (c) selecting a predetermined bottom end stop member from among a plurality of bottom end stop members differing in type, form, material or color and attaching the same to a corresponding one of the stringer chains upon detection of the marking means, (d) selecting a predetermined slider from among a plurality of sliders differing in type, form, material or color and attaching the same to the corresponding one of the stringer chains upon detection of the marking means, (e) attaching a top end stop member to the corresponding one of the stringer chains, and (f) cutting the stringer chains centrally across the element-free space portions into individual slide fastener products.

According to a further aspect of the invention, there is provided a method of manufacturing slide fasteners which comprises the steps of: (a) gapping an elongate continuous stringer chain to provide element-free space portions at predetermined intervals therealong, (b) selecting a predetermined reinforcing strip from among a plurality of reinforcing strips differing in type, form, material or color and attaching the same to the stringer chain, (c) selecting a predetermined separator from among a plurality of separators differing in type, form, material or color and attaching the same to the stringer chain, (d) selecting a predetermined slider from among a plurality of sliders differring in type, form, material or color and attaching the same to the stringer chain, (e) attaching a top end stop member to the stringer chain, and (f) cutting the stringer chain centrally across the element-free space portions into individual slide fastener products.

According to still another aspect of the invention, there is provided a method of manufacturing slide fasteners which comprises the steps of: (a) interconnecting a plurality of stringer chains of predetermined lengths differing in type, form, material or color and providing the stringer chains with marking means at their interconnected junctions, (b) gapping the stringer chains to provide element-free space portions at predetermined intervals therealong, (c) selecting a predetermined reinforcing strip from among a plurality of reinforcing strips differing in type, form, material or color and attaching the same to a corresponding one of the stringer chains upon detection of the marking means, (d) selecting a predetermined separator from among a plurality of separators differing in type, form, material or color and attaching the same to the corresponding one of the stringer chains upon detection of the marking means, (e) selecting a predetermined slider from among a plurality of sliders differing in type, form, material or color and attaching the same to the corresponding one of the stringer chains upon detection of the marking means, (f) attaching a top end stop member to the corresponding one of the stringer chains, and (g) cutting the fastener chains centrally across the element-free space portions into individual slide fastener products.

According to a still further aspect of the invention, there is provided an apparatus for carrying the method of manufacturing slide fasteners into practice which comprises: a gapping unit comprising a punch and a die anvil for gapping an elongate continuous stringer chain to provide element-free space portions at predetermined intervals therealong; a bottom end stop applying unit comprising a first feed means movable back and forth in a direction parallel to the path of travel of the stringer chain and including a plurality of pressure rollers rotatably supported in spaced parallel relation to one another and engageable with a corresponding number of bottom end stop forming flat wire strips, a transfer means including a feed roller engageable selectively with one of the pressure rollers to feed a selected one of the wire strips, a second feed means including a pressure roller and a feed roller for feeding the selected one of wire strips, and a bottom end attaching means for attaching the selected one of wire strips to the stringer chain; a slider applying unit comprising a slider inventory means including a plurality of slider stockers arranged in spaced parallel relation to one another and releasably holding sliders thereon, a slider transfer means including a slider transfer holder movable transversely across the slider stockers to capture the sliders from a selected one of the slider stockers, and a slider guide means receiving and transferring the sliders onto a slider holder for applying the same to the stringer chain; a top end stop applying unit for attaching top end stops onto the stringer chain immediately after the sliders are applied; and a cutting unit comprising vertically disposed coacting cutters for cutting the stringer chain across the space portion into individual slide fastener products, all of the operative units being controlled by computer programs to selectively provide fastener component parts compatible with a selected characteristic of a slide fastener product.

DETAILED DESCRIPTION OF THE INVENTION

Figure 1:
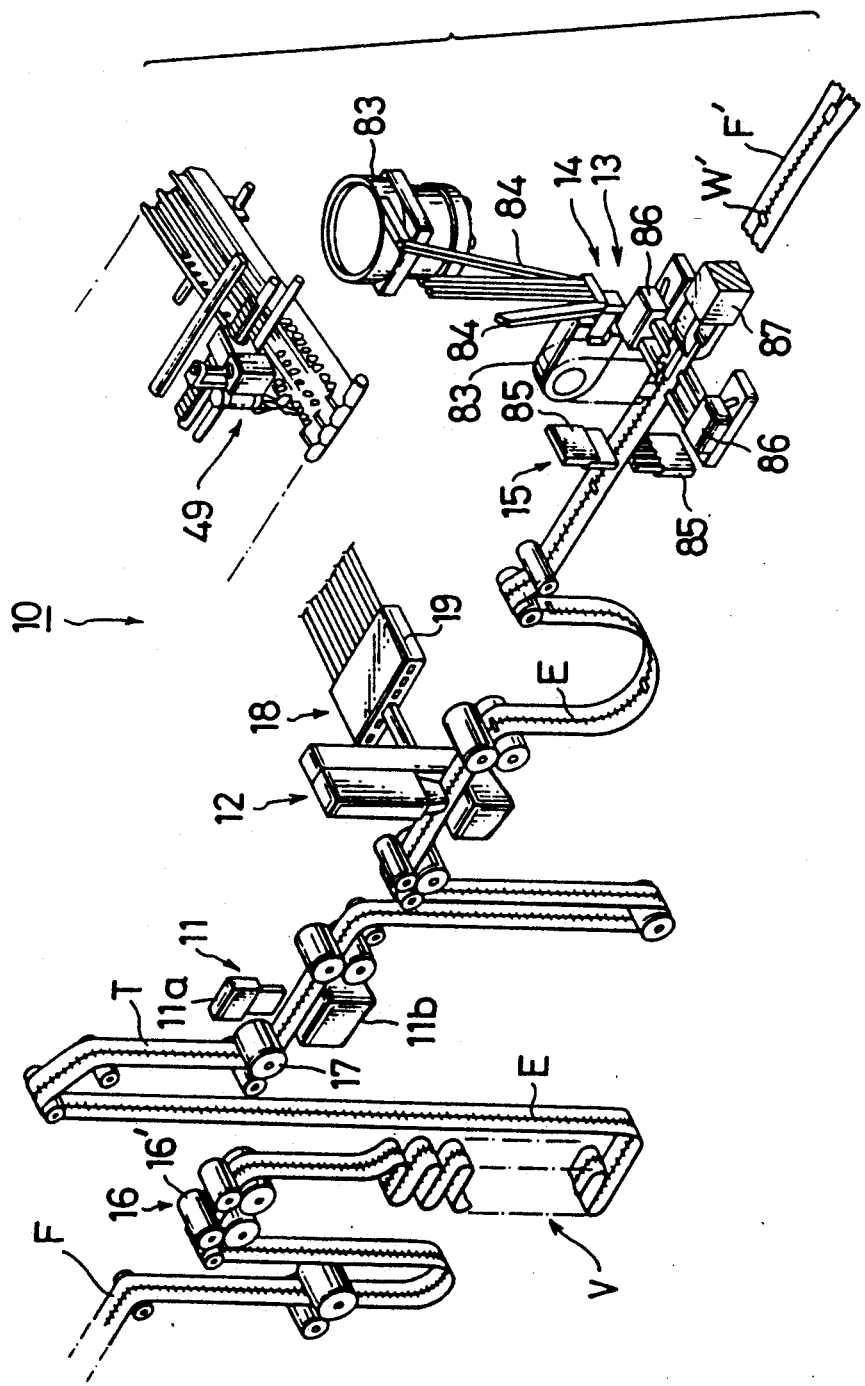
FIG. 1 is a schematic perspective view diagrammatically illustrating the overall process steps involved in the manufacture of slide fasteners according to the invention.
Figure 2:
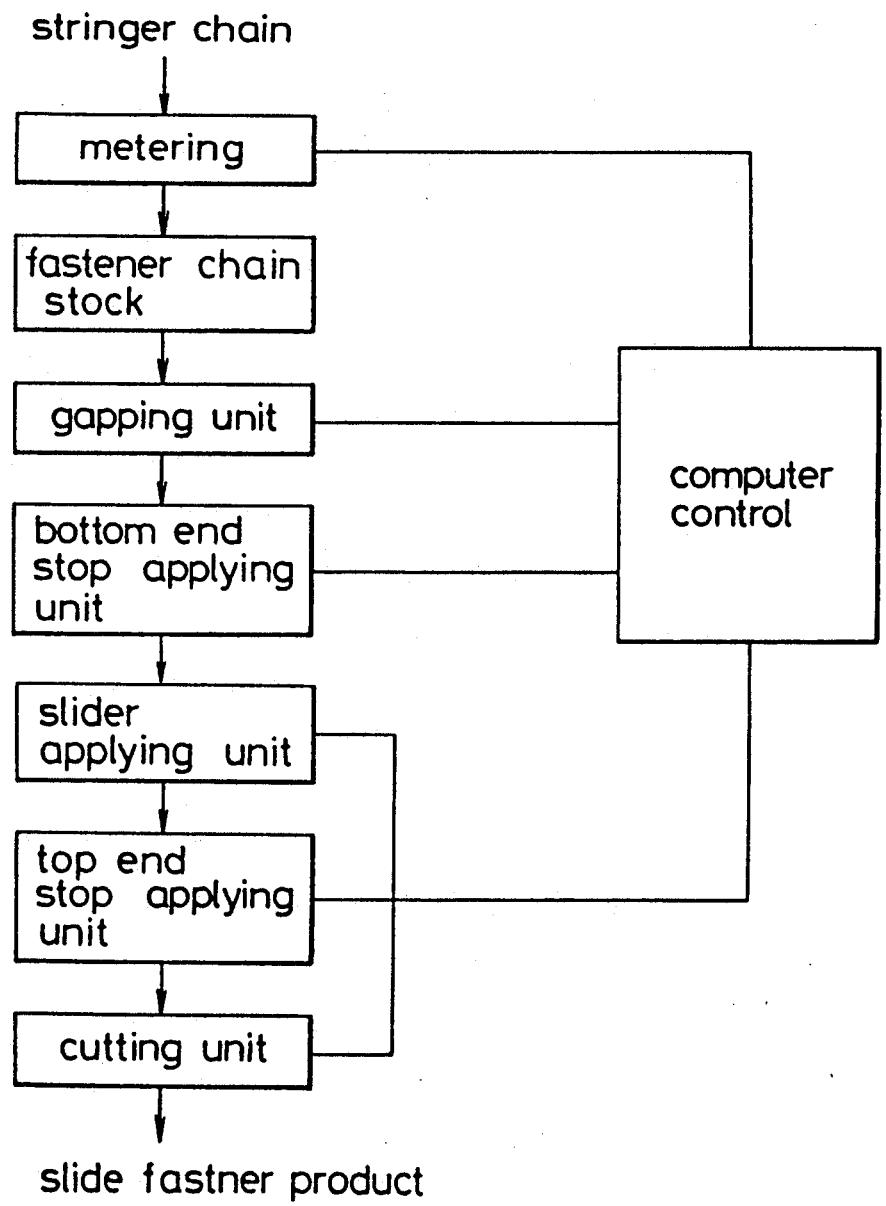
FIG. 2 is a block diagram showing the various stages of parts assembling for a non-separable slide fastener.

Referring now to the drawings and FIGS. 1 and 2 in particular there is shown an apparatus carrying the method of the invention into practice for manufacturing a non-separable type of slide fastener, which apparatus generally designated 10 essentially comprises a gapping unit 11, a bottom end stop applying unit 12, a slider applying unit 13, a top end stop applying unit 14, and a cutting unit 15. These units are represented by respective blocks in FIG. 2.

Figure 4:
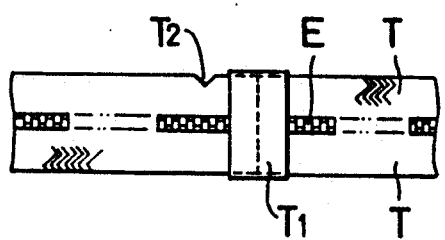
FIG. 4 is a segmentary plan view of a stringer chain.

A starting stringer chain F comprises a pair of oppositely disposed stringer tapes T, T and a row of fastener coupling elements E attached to an inner longitudinal edge of each of the tapes T, T. The coupling elements E may be formed from a metallic or plastics material into a continuous helical coil or meandering structure or into a discrete formation. For purposes of illustration, the stringer chain F is in the form of elongate continuous or substantially endless chain having tapes T, T and elements E of different colors, or in the form of such a chain which comprises a plurality of interconnected individual stringers of a predetermined length having tapes T, T and elements E of different forms and colors. Each of such interconnected stringers is joined wit adjacent stringers by a connecting strip $T_1$ and marked or otherwised notched at an outer longitudinal edge of the tape T, as at $T_2$ as shown in FIG. 4. The connecting strips $T_1$ may be utilized as a means of identifying the type or form of fastener component parts to be applied onto a stringer chain F. However, to ensure fool-proof identification of the stringer chain F, the notch or other suitable marking means $T_2$ may be effectively used for detection by for example a photoelectric sensor not shown.

Figure 3A:
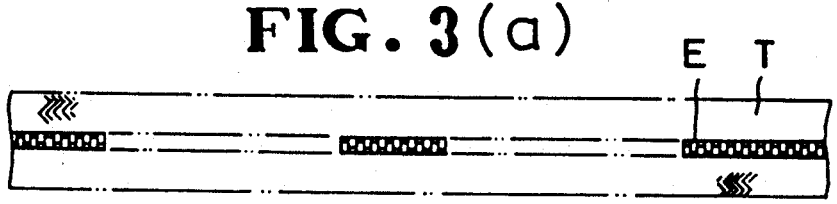
FIGS. 3(a)-3(e) inclusive are plan views of a fastener stringer chain shown progressively assembled and finished.
Figure 3B:
Figure 3C:
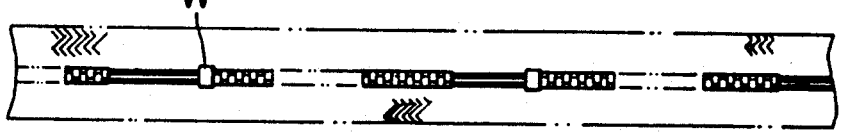

The starting stringer chain F supplied from a source not shown is metered by a metering roll assembly 16 which meters the length of the chain F by counting the number of revolutions for instance of a roll 16′, and the feeding of the stringer chain F is arranged to stop upon completion of a predetermined number of revolutions of the roll 16′. A reserve vessel V is provided for storing a plurality of stringer chains F of different lengths and product characteristics which have been metered and fed from the metering assembly 16. The chain F is advanced by feed rolls 17 into the gapping unit 11, which essentially comprises a punch 11a and a die anvil 11b disposed in vertical confronting relation to each other, and gapped at a predetermined position to remove a length of coupling elements E thereby providing an element-devoid space portion T' at predetermined intervals as shown in FIG. 3b.

The stringer chain F is then introduced to the bottom end stop applying unit 12 whereby a bottom end stop (W') is attached to the chain F at an endmost coupling element E' lying in the space portion T' which has been provided at the gapping unit 11.

Figure 5:
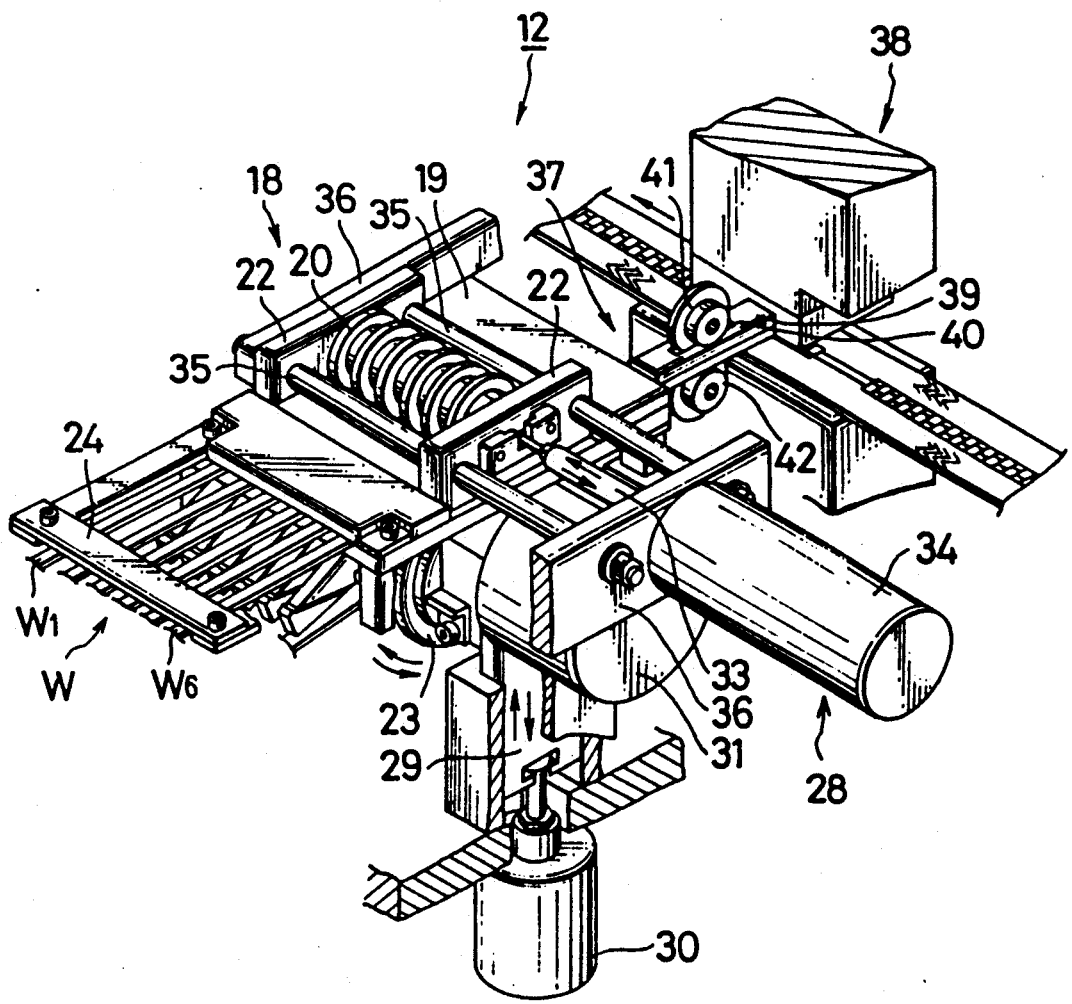
FIG. 5 is a perspective view of an apparatus for feeding and applying bottom end stops to the stringer chain.
Figure 6:
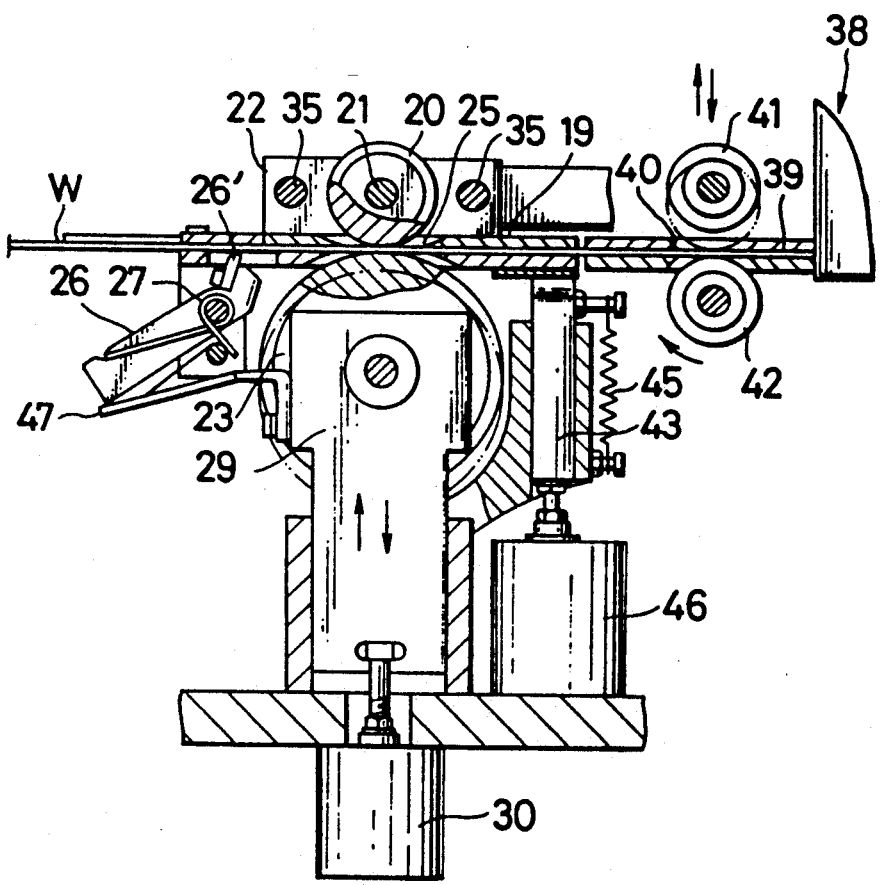
FIG. 6 is a longitudinal cross-sectional view of the apparatus of FIG. 5.

The bottom end stop applying unit 12 which constitutes an important part of the invention is better shown in FIGS. 5 and 6. The unit 12 comprises a first feed means 18 including a feed table 19 movable back and forth in a direction parallel to the path of travel of the stringer chain F. A plurality of pressure rollers 20 are coaxially mounted on a shaft 21 journalled in opposed bearing plates 22 integral with the feed table 19 and selectively engageable with a feed roller 23 to feed a selected one of a plurality of bottom end stop forming elongate flat wire strips $W_1$-$W_6$ in a manner hereinafter to be described. The feed table 19 includes a transverse guide member 24 located at a rear end remote from the path of the stringer chain F and adapted to hold the wire strips $W_1$-$W_6$ in spaced parallel alignment as shown in FIG. 5.

The feed table 19 has a number of longitudinal slits 25 (FIG. 6) corresponding to the number of pressure rollers 20 which is six in all as in the illustrated embodiment but which is variable from two to any number desired depending upon the types or colors of the wire strips W to be applied to the stringer chain F. The wire strips $W_1$-$W_6$ are held in controlled relation to the peripheries of the pressure rollers 20 across the slits 25 in the feed table 19 and are selectively fed one at a time when the feed roller 23 is brought into nipping engagement with a selected one of the pressure rollers 20.

Designated at 26 is a backlash stopper pivotably connected to the table 19 and underlying each of the wire strips $W_1$-$W_6$. The stopper 26 has at one of its ends a finger portion 26' which is normally urged by a spring 27 toward the wire strip W to prevent the latter from moving back inadvertently during operation of the apparatus.

A transfer means generally designated at 28 is provided for transferring the wire strips $W_1$-$W_6$ selectively one at a time from the first feed means 18 onto a second feed means later described. The transfer means 28 comprises a support block 29 which is vertically movable by means of a pneumatic cylinder 30 and on which the feed roller 23 is rotatably supported, and a reversible motor 31 adapted to drive the feed roller 23 both in forward and reverse directions. The support block 29 on actuation of the cylinder 30 brings the feed roller 23 into and out of nipping engagement with a selected one of the pressure rollers 20.

The pressure rollers 20 are selectively engageable with the feed roller 23 by the movement of the feed table 19 which takes place in a direction transversely across the array of wire strips $W_1$-$W_6$ or parallel to the path of the stringer chain F.

The above movement of the table 19 is effected by a table drive means comprising a reciprocating piston 33 actuated by a pneumatic cylinder 34 and a pair of stationary support rods 35 extending horizontally from oppositely disposed frame members 36. The bearing plates 22, one of which is connected to the piston 33, are slidably mounted on the support rods 35 so that the feed table 19 integral with the bearing plates 22 can be moved back and forth and relative to and between the frame members 36. The stroke of the piston 33 is controlled by a computer program system not shown so that the feed table 19 move intermittently a preset distance to bring a particular selected one of the pressure rollers 20 into registry peripherally with the feed roller 23.

Figure 9:
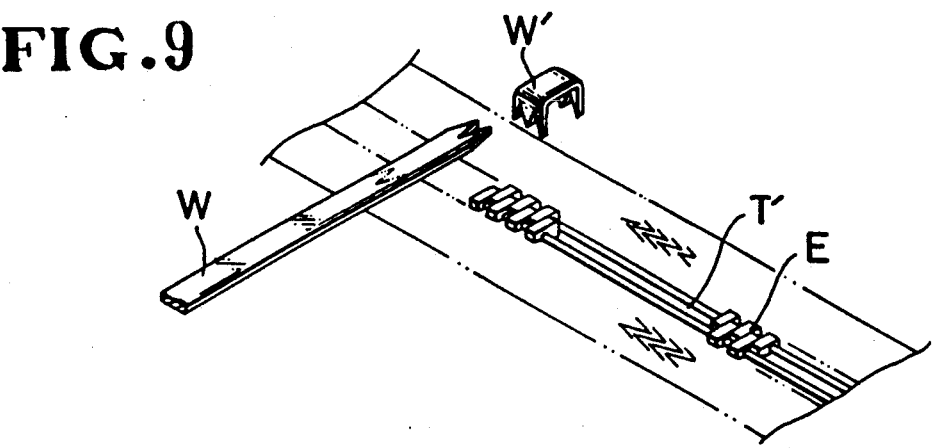
FIG. 9 is a schematic perspective view showing a bottom end stop being applied to the stringer chain.

A second feed means 37 is connected directly to a bottom end stop attaching means 38 of a known construction which is designed to cut the wire strip W into a staple-like end stop W' and attach the same to the endmost coupling element E' at a leading end of the space portion T' of the stringer chain F as illustrated in FIG. 9. The second feed means 37 comprises a transfer table 39 having a longitudinal slit 40 and a pressure roller 41 disposed above the table 39 and a feed roller 42 disposed under the table 39 in confronting relation to the pressure roller 41. The pressure roller 41 is vertically movable toward and away from the feed roller 42 as shown in FIG. 6 and engageable with the latter across the slit 40 which is disposed in alignment with the periphery of the feed roller 23 in the transfer means 28.

Figure 12A:
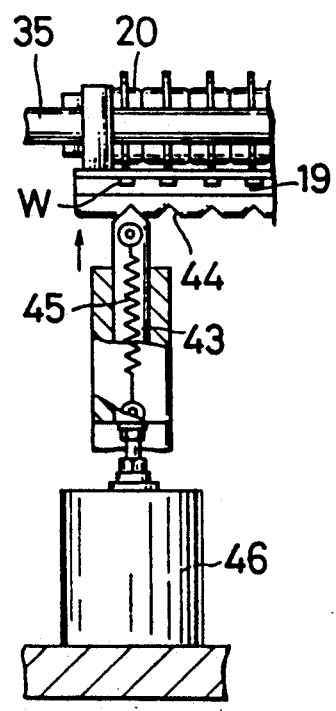
FIGS. 12(a) and 12(b) are partly sectional elevational view of a portion of the apparatus of FIG. 5.
Figure 12B:
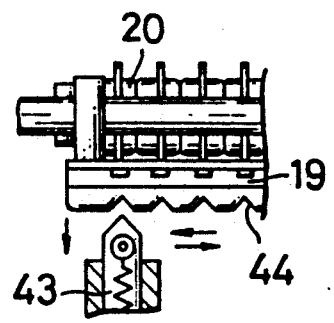

A vertical retainer rod 43 is provided under the feed table 19 at the front end thereof adjacent to the transfer table 39 and is engageable selectively with one of lock grooves 44 formed in the lower surface of the feed table 19 in a corresponding number to and are located in registry with the pressure rollers 20 or the number of passageways for the wire strips $W_1$-$W_6$ in the first feed means 18 as better shown in FIGS. 12(a) and 12(b). The retainer rod 43 is normally biased by a spring 45 downwardly away from the feed table 19 and is movable upwardly by the action of a pneumatic cylinder 46 into locking engagement with one of the grooves 44 so as to retain the feed table 19 in position against displacement as shown in FIG. 12(a).

Figure 10:
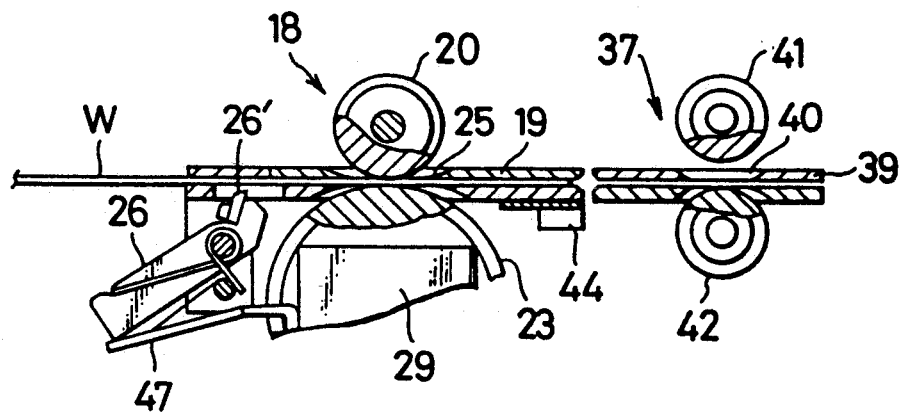
FIGS. 10(a) and 10(b) are cross-sectional views of a portion of the apparatus of FIG. 5.
Figure 10:
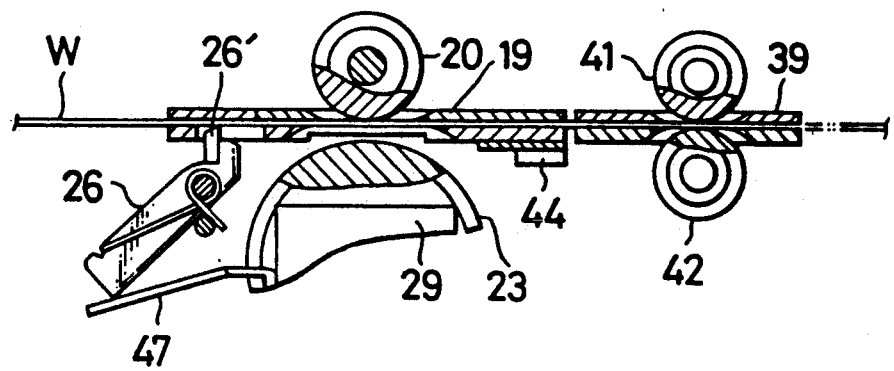

A release finger member 47 extends from the support block 29 into abutting engagement with the backlash stopper 26 and is adapted with upward movement of the support block 29 to rotate the stopper 26 against the tension of the spring 27 so as to release the stopper finger portion 26' from the particular wire strip W which has been selected for attachment to the stringer chain F as shown in FIG. 10(a).

Figure 7:
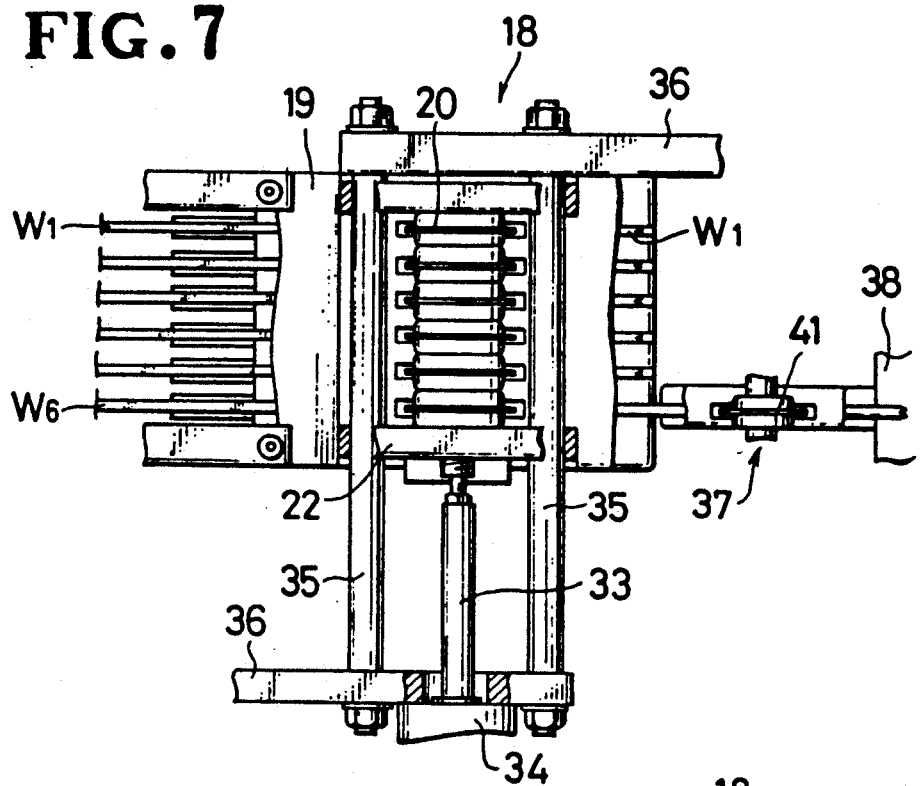
FIG. 7 is a plan view of the apparatus of FIG. 5 shown in one phase of operation.
Figure 8:
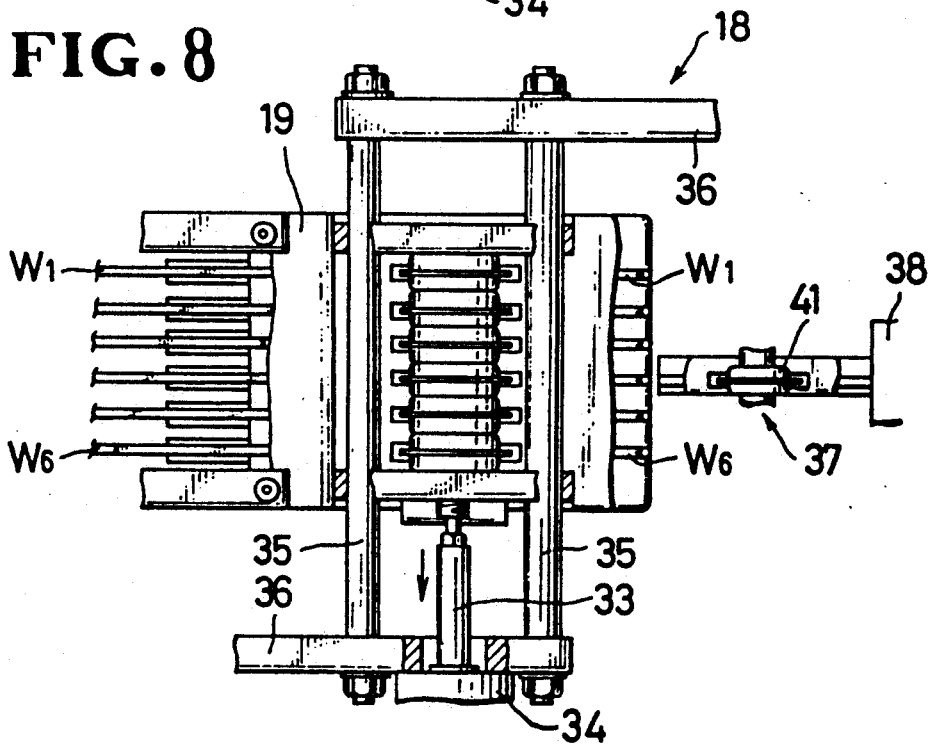
FIG. 8 is a view similar to FIG. 7 but showing the apparatus of FIG. 5 in another phase of operation.

The bottom end stop applying unit 12 thus constructed operates in accordance with preset computer programs whereby a particular one of the wire strips $W_1$-$W_6$ differing for example in color is selectively fed and formed into an individual bottom end stop W' for attachment to the stringer chain F. The wire strips $W_1$-$W_6$ are fed from respective spools not shown and, introduced into the first feed means 18 in equally spaced relation to one another and in registry with the corresponding pressure rollers 20. They are arranged with their respective leading ends held in alignment at a front end of the feed table 19 facing the path of the stringer chain F. In this preparatory operation, the blacklash stoppers 26 are disposed with their respective fingers portions 26' in sliding contact with the respective wire strips $W_1$-$W_6$, but the feed roller 23 in the transfer means 28 is held apart from any of the pressure rollers 20 as shown in FIG. 10(b) and the retainer rod 43 is also disengaged from any of the lock grooves 44 as shown in FIG. 12(b). The feed table 19 is now moved in a direction parallel to the path of the chain F, by the cylinder piston 33 for instance from the position of FIG. 7 to the position of FIG. 8 at which the wire strip $W_4$ alone amongst the other strips W is brought into alignment with the slit 40 of the transfer table 39 in the second feed means 37. This is detected and followed by ascending the retainer rod 43 into engagement with the lock groove 44 as shown in FIG. 12(a) thereby locking the feed table 19 in position against displacement, whereupon the feed roller 23 ascends and comes into nipping engagement with the particular pressure roller 20 which is associated with the selected wire strip $W_4$, and the release finger member 47 releases the backlash stopper 26 from the wire strip $W_4$. The feed roller 23 then rotates and advances the selected wire strip $W_4$ toward the second feed means 37, the arrival of the strip $W_4$ at the slit 40 in the transfer table 39 being detected whereupon the feed roller 23 is stopped and lowered to allow the backlash stopper 26 to rotate back into abutting engagement with the wire strip $W_4$ to arrest the latter against backward movement. The pressure roller 41 in the second feed means 37 then descends and comes into nipping engagement with the feed roller 42 in the zone of the slit 40 to feed the wire strip $W_4$ into the end stop attaching machine 38 wherein the strip $W_4$ is cut into a staple-like end stop and attached onto the stringer chain F.

Preparatory to changing the feed of wire strips $W_1$-$W_6$, the feed roller 42 in the second feed means 37 is discontinued and the pressure roller 41 is moved upwardly away from the transfer table 39. The feed roller 23 in the transfer means 28 is moved upwardly into nipping engagement with the pressure roller 20 in the first feed means 18 and rotated in the reverse direction until the leading end of the wire strip $W_4$, which has been cut, reaches back in alignment with those leading ends of the remaining wire strips W in the feed table 19. The feed roller 23 is stopped and the retainer rod 43 disengaged from the lock groove 44, so that the feed table 29 is ready to move to commence a next cycle of operation according to a given computer program.

Figure 11:
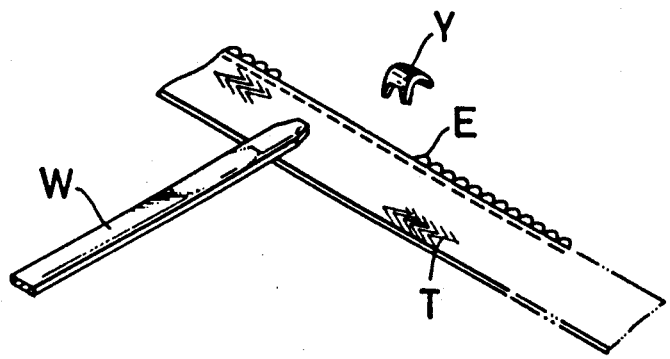
FIG. 11 is a schematic perspective view showing a top end stop being applied to the stringer chain.

The above-described bottom end stop applying unit 12 can be utilized equally to feed and attach a top end stop Y to the stringer chain F at an inner edge thereof as illustrated in FIG. 11.

The stringer chain F having a selected one of the bottom end stops W thus attached thereon is further advanced into the slider applying unit 13 wherein a slider S of a particular characteristic, for example, a specific color compatible with the stringer chain F is selectively applied.

Figure 14:
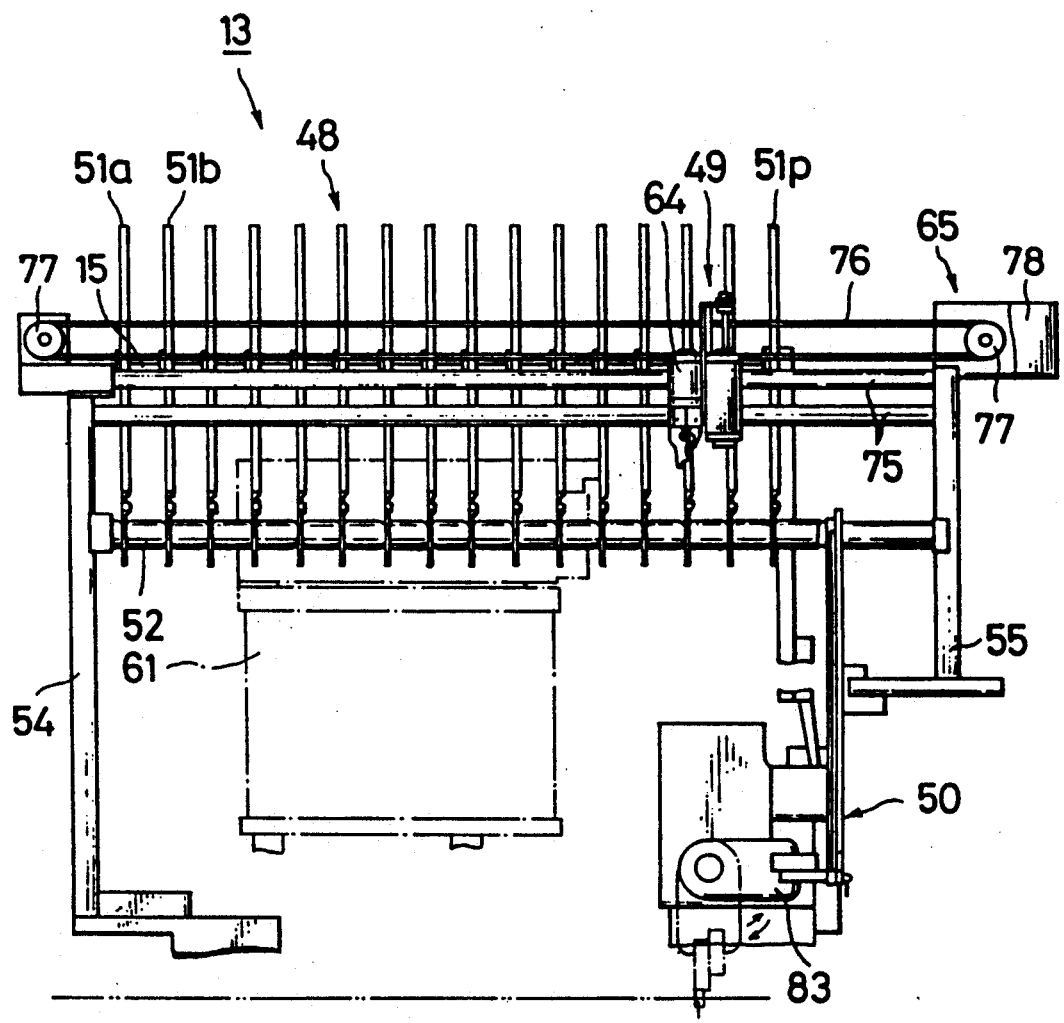
FIG. 14 is a front elevational view of the same.
Figure 15:
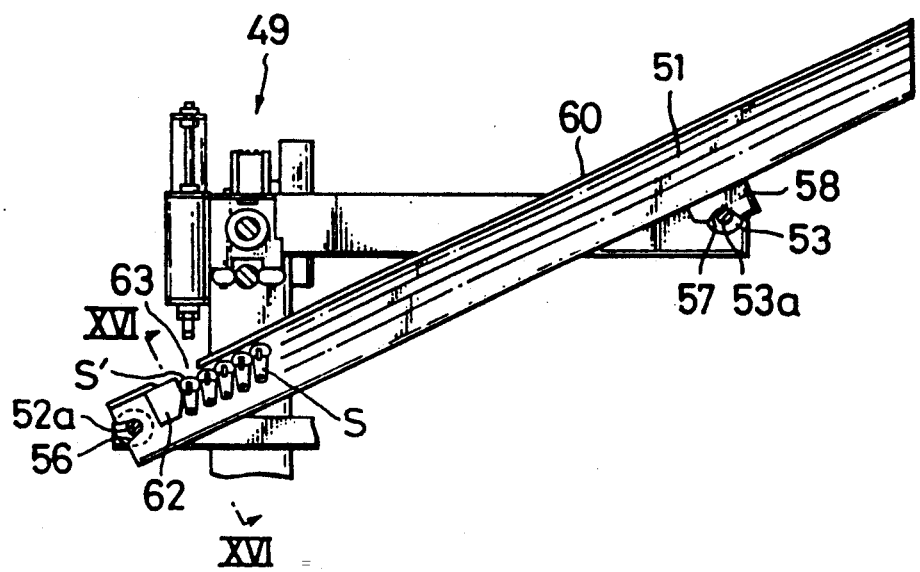
FIG. 15 is a side elevational view of a portion of the apparatus of FIG. 13.
Figure 16:
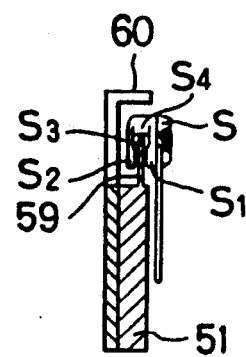
FIG. 16 is a cross-sectional view taken on the line XVI—XVI of FIG. 15.

The slider applying unit 13 essentially comprises a slider inventory means 48, a slider transfer means 49 and a slider guide means 50. The slider inventory means 48 comprises a plurality of slider stockers 51a-51p each releasably holding sliders S thereon, arranged in spaced parallel relation to one another and supported at one end on a first stocker holder 52 and at the opposite end on a second stocker holder 53, both holders 52, 53 being in the form of an elongated rod. The second stocker holder 53 is located at a level higher than the first stocker holder 52 such that the slider stockers 51a-51p are tilted downwardly to facilitate sliding downward movement of individual sliders S by gravity in and along the stockers 51a-51p. The first and second stocker holders 52, 53 each extend horizontally between and secured to vertical support columns 54, 55 and each have coaxial cores 52a and 53a exposed through peripheral grooves 52b and 53b provided at intervals corresponding to the slider stockers 51a-51p. Each of the slider stocker 51a-51p has a notch 56 at its lower end for hooked engagement with the cores 52a of the first stocker holder 52 and another notch 57 formed in a downwardly projecting lug 58 at its upper end portion for hooked engagement with the core 53a of the second stocker holder 53 as shown in FIG. 15, the arrangement being that the slider stockers 51a-51p may be readily removed for exchange or replacement. Each slider stocker has a longitudinal rail 59 along which the sliders S slide down by gravity. More specifically, the slider has an upper wing $S_1$ and a lower wing $S_2$ defining therebetween a guide channel $S_3$ terminating at a neck $S_4$, and the slider is mounted with its upper and lower wings $S_1$, $S_2$ astride the rail 59 of each of the slider stockers 51a-51p as better shown in FIG. 16. The slider stockers each has a longitudinal inverted L-shaped cover 60 overlying and preventing the sliders S from falling out or derailing. The slider stocker may be in the form of a typical chute devoid of such cover 60 as shown at the extreme left of FIG. 13, in which instance the sliders S are fed to the chute conveniently from a vibratory feeder 61 (FIG. 14) as is well known in the art.

The slider stockers 51a-51p each have at their respective lower end portions a stopper block 62 configured to hold a leading or lowermost slider S' straight and upright for delivery to the slider transfer means 49. The cover 60 of each slider stocker is cut off adjacent to the stopper block 62 to define therewith an opening 63 for the passage of the leading slider S' as shown in FIG. 15.

Figure 17A:
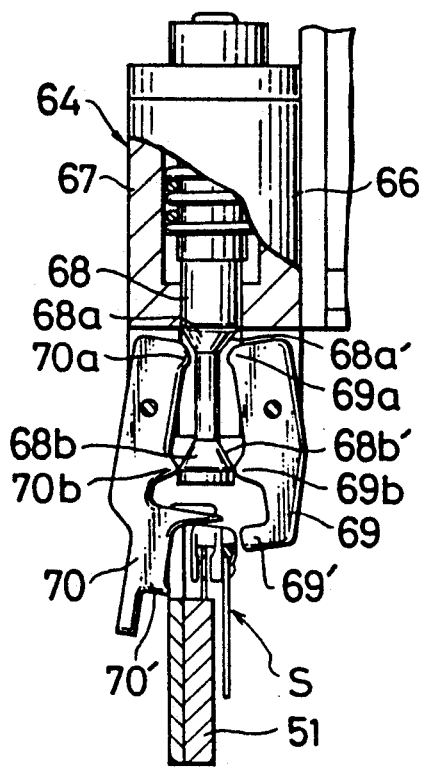
FIG. 17(a) is a partly sectional elevational view of a gripper portion of the apparatus of FIG. 13 shown in one phase of operation.
Figure 17B:
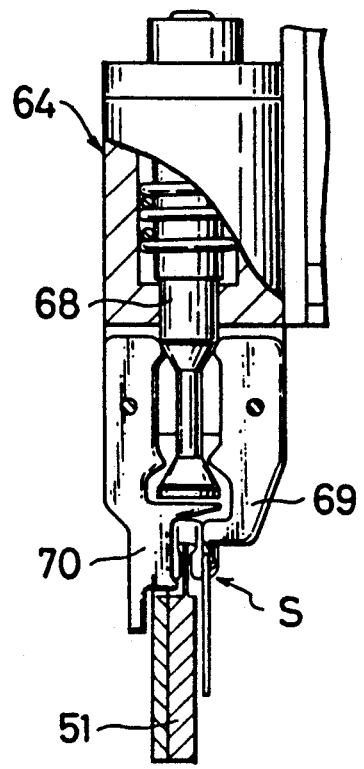
FIG. 17(b) is a view similar FIG. 17(a) but showing the same in another phase of operation.
Figure 18A:
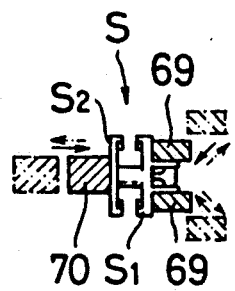
FIGS. 18(a) and 18(b) are schematic views utilized to explain the operative relationship between the apparatus of FIGS. 17(a) and 17(b) and the slider.
Figure 18B:
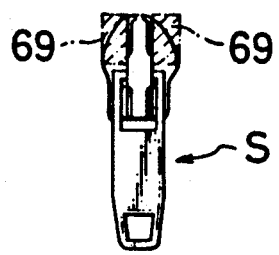
Figure 19A:
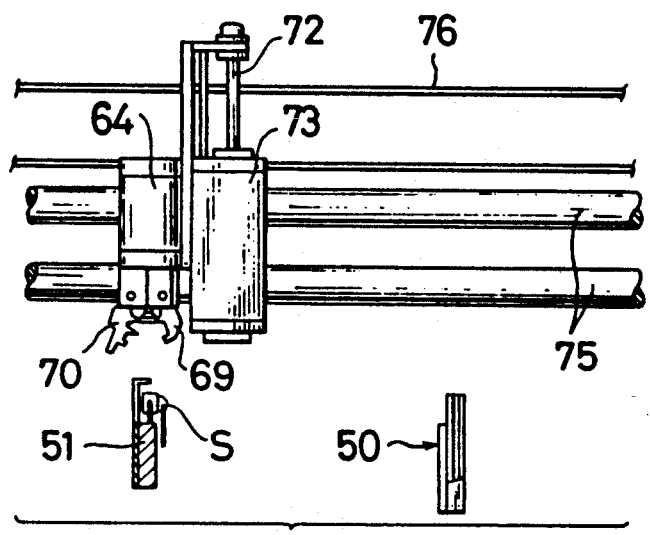
FIGS. 19(a)-19(d) inclusive are schematic views illustrating the manner of feeding the sliders.
Figure 19B:
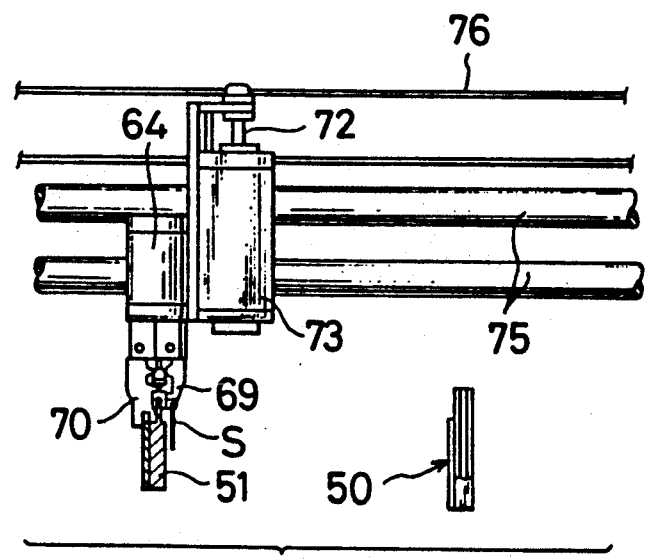
Figure 19:
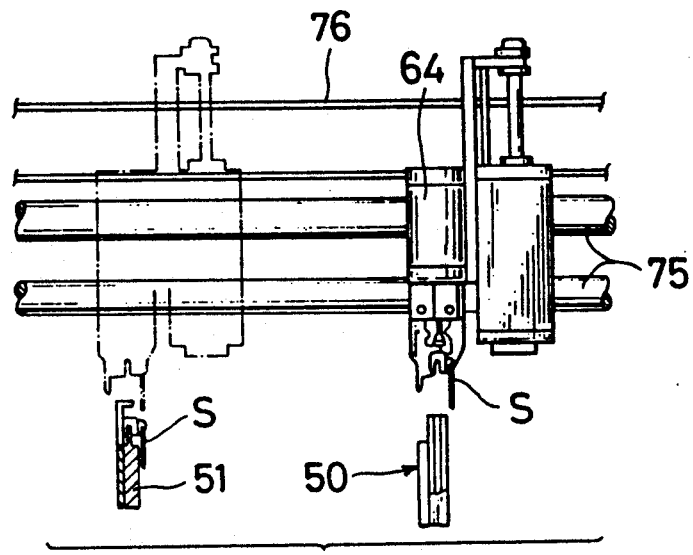
Figure 19:
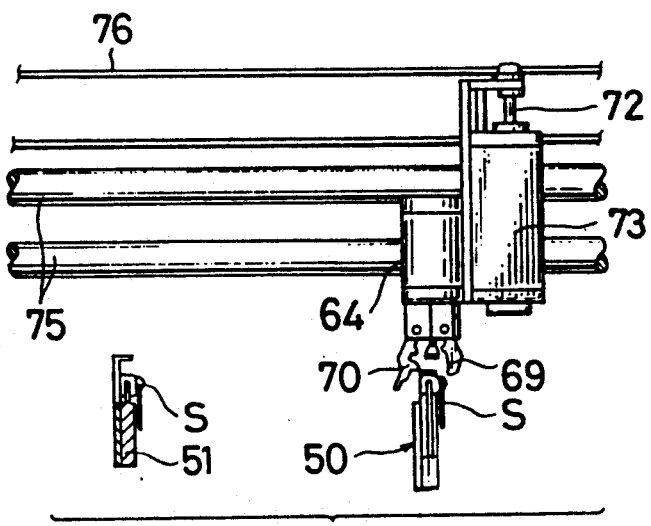

The slider transfer means 49 essentially comprises a slider transfer holder 64 and a slider transfer holder drive 65. The transfer holder 64 includes a casing 66 accommodating therein a first pneumatic or hydraulic cylinder 67 and associated piston rod 68, a pair of front grippers 69, 69 and a rear gripper 70 both pivotally connected to the casing 66 as better shown in FIGS. 17(a) and 17(b). The piston rod 68 is reciprocated vertically to spread apart and bring together the coacting front grippers 69, 69 and rear gripper 70. The piston rod 68 has a first cam 68a at one end and a second cam 68b at the opposite end, the first cam 68a having a conical, downwardly convergent peripheral surface 68a' and the second cam 68b having a conical, downwardly divergent peripheral surface 68b'. The front grippers 69, 69 and the rear gripper 70 each have first cam follower surfaces 69a, 69a, and 70a and second cam follower surfaces 69b, 69b and 70b at their respective inner edges in confronting relation to the first cam 68a and the second cam 68b respectively of the piston rod 68. This camming arrangement allows, with reciprocal movement of the piston rod 68, the grippers 69, 69 and 70 to spread apart to let the slider S fall as shown in FIGS. 19(a) and to meet together to grip the slider S as shown in FIGS. 17(b) and 19(b). The pair of front grippers 69, 69 are arranged with their jaws 69', 69' to come into abutting engagement with the upper surface of the upper wing $S_1$ on opposite sides of the neck portion $S_4$ as shown in FIG. 18(b), while the rear gripper 70 has its jaw 70' abutting against the majority of the lower surface of the lower wing $S_2$ of the slider S. Since the pair of grippers 69, 69 are arranged to move obliquely downwardly toward each other by means not shown, this movement will correct the posture of the slider S should there be any misalignment, as illustrated in FIG. 18(a).

The slider transfer holder 64 is connected via connecting plate 71 to a piston rod 72 of a second pneumatic or hydraulic cylinder 73 and is thus vertically movable with the piston rod 72 toward and away from the array of slider stockers 51a–51p. The cylinder 73 is connected to a movable support block 74 which is movably supported on a pair of horizontal guide rods 75 extending transversely across the array of slider stockers 51a–51p between the oppositely disposed vertical support columns 54, 55.

The slider transfer holder 64 is reciprocably movable transversely across the array of slider stockers 51a–51p by means of its drive 65 which comprises an endless timing drive belt 76 spanning between opposed pulleys 77 in parallel with the guide rods 75, one of which pulleys is connected to and driven by an encoder-controlled reversible motor 78. The motor 78 is controlled so that the slider transfer holder 64 reciprocates between the position of a selected one of the slider stockers 51a–51p and the position of the slider guide means 50. To facilitate smooth sliding movement of the slider transfer holder 64, there are provided a pair of guide rollers 79 rotatably secured to the movable support block 74 and disposed in rotating relation to one of the guide rods 75.

Figure 13:
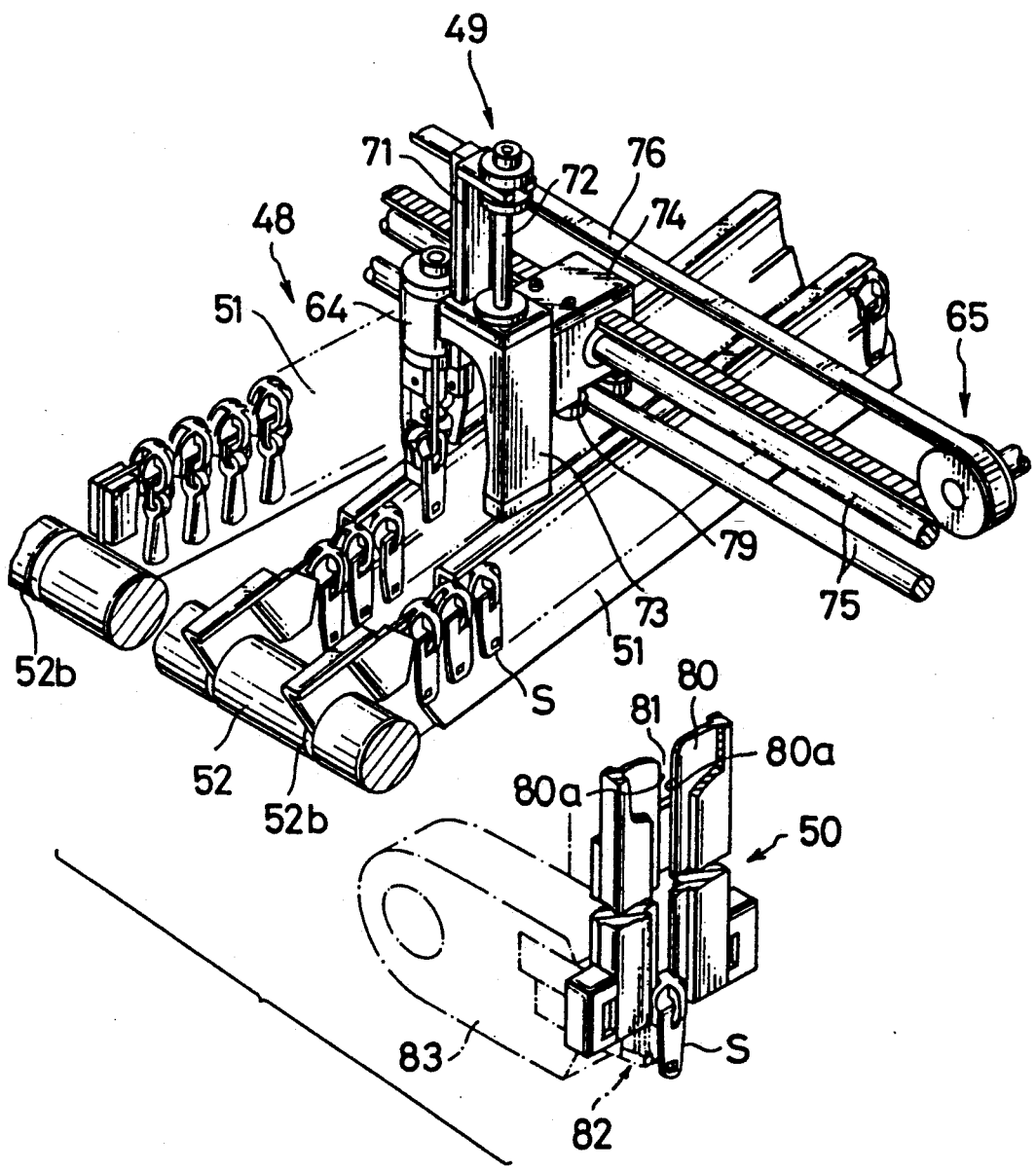
FIG. 13 is a perspective view of an apparatus for feeding and applying sliders to the fastener stringer chain.

The slider guide means 50 comprises a vertically disposed guide plate 80 having an elongate guide slit 81 defined by confronting inner longitudinal edges 80a. The upper end of the guide plate 80 is located in close proximity to an endmost stocker holder 51 adjacent to the support column 55 and is preferably flared to provide increased opening for receiving the slider S from the slider transfer holder 64. Operatively connected to the lower end of the guide plate 80 is a slider holder 82 of conventional construction having a nest (not shown) communicating with the guide slit 81 and connected to a swing arm 83 pivotally movable toward and away from the path of the stringer chain F. The slider S, when transferred from the transfer holder 64, slides down the guide plate 80 with its channel $S_3$ received at the inner edges 80a and with its neck portion $S_4$ received in the guide slit 81 as shown in FIG. 13. The sliders S are then further transferred one at a time onto the slider holder 82 for threading through the stringer chain F in a manner well known.

The slider applying unit 13 thus constructed operates in accordance with preset computer programs, whereby the slider transfer holder 64 is assigned to capturing the sliders S stored for instance in the slider stocker $51_n$ which has an inventory of sliders S having a particular form of pull tabs, a particular color, or a particular type of function which is compatible with the stringer chain F entering the unit 13. The slider transfer holder 64 moves by rotation of the pulleys 77 clockwise over to and stops at the position of the slider stocker $51_n$ as shown in FIG. 19(a), whereupon the piston 72 of the cylinder 73 is actuated to lower the transfer holder 64 and at the same time the piston 68 of the cylinder 67 is actuated to bring the grippers 69, 69 and 70 together thereby gripping therebetween the lowermost or leading slider S' as shown in FIG. 19(b). The slider transfer holder 64 thus picks up the leading slider S' and moves up, followed by rotation of the pulleys 77 counterclockwise to carry the transfer holder 64 over to the position of the slider guide means 50, at which the slider S' on the transfer holder 64 is held in alignment with the slit 81 of the guide plate 80 as shown in FIG. 19(c). This is followed by downward movement of the transfer holder 64 and then by actuation of the piston 68 to spread the grippers 69, 69, 70 apart, whereupon the slider S' drops onto the guide plate 80 as shown in FIG. 19(d) and is picked up by the slider holder 82 for attachment onto the stringer chain F, as illustrated in FIG. 3(e) in a well known manner.

The above operation of the slider applying unit 13 is automatically carried out under computer program control to selectively feed the sliders S one at a time from among a plurality of slider stockers 51a–51p.

The stringer chain F thus assembled with selected ones of sliders S and selected ones of bottom end stops W' is now provided at the top end stop applying unit 14 with top end stops Y supplied from a parts feeder 83 via chutes 84, the top end stop Y being attached to the inner edge of the stringer tape T immediately after the slider S is applied, in a manner well known and shown in FIG. 11. Since the top end stops Y are relatively small in size and are substantially concealed from view when the slider S is pulled all way up, they may all be of the same type and color. However, if desired, top end stops Y of different types or colors may be selectively applied to the fastener chain F by utilizing the above-described bottom end stop applying unit 12.

Figure 3D:
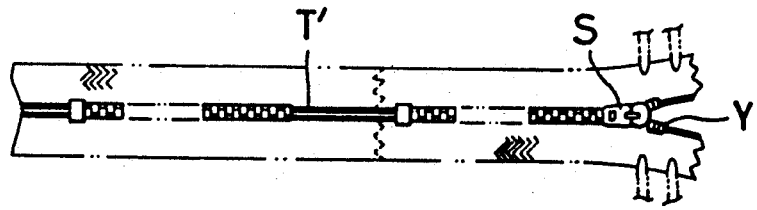
Figure 3E:
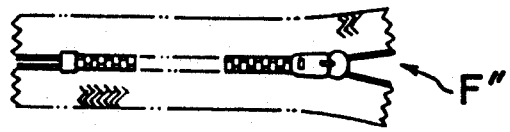

The fastener chain F now fully assembled is cut centrally across the space portion T' of the stringer tapes T, T, as shown in FIG. 3(d), into an individual slide fasteners product F'. This cutting is performed at the cutting unit 15 located downstream of the slider applying unit 13 and comprising vertically disposed coacting cutters 85 of any conventional construction.

Designated at 86 are a pair of feed grippers which are arranged to move reciprocably along the path of the stringer chain F to hold the ensuing leading portion of the stringer chain F and bring the latter into position for the next cycle of parts assembling operation in a manner well known. Designated at 87 is a withdrawal gripper which draws the finished slide fastener F' out for storage.

All of the foregoing units 11–15 are correlated in operation and controlled by computer programs as schematically shown in FIG. 2.

Figure 21A:
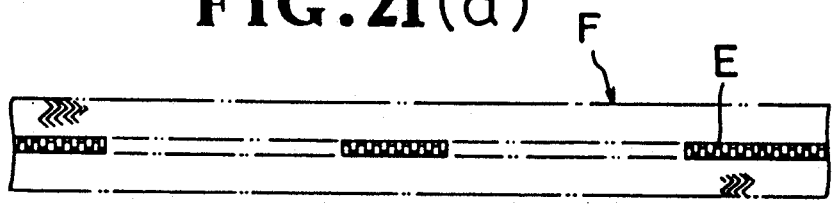
FIGS. 21(a)-21(f) are plan views of a stringer chain shown progressively assembled and finished.
Figure 21B:
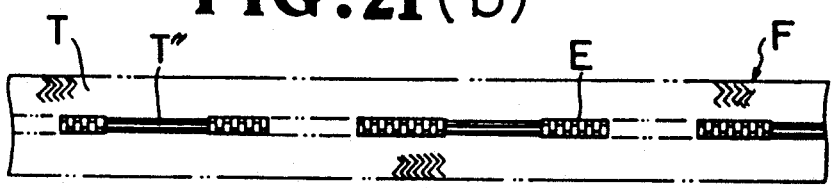
Figure 21C:
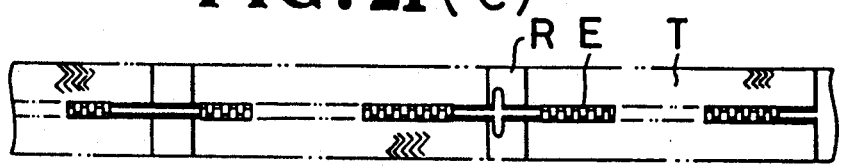
Figure 21D:
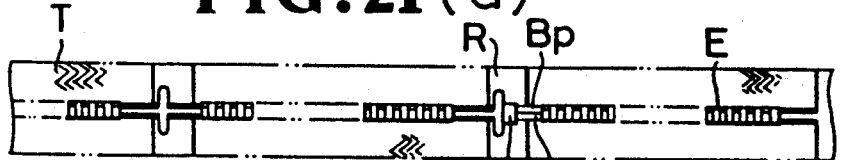
Figure 21E:
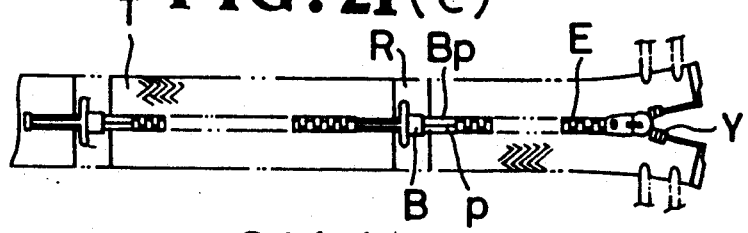
Figure 21F:
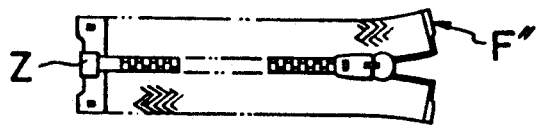

The invention will now be further described in connection with the method of making slide fasteners of a separable type contrastive to the non-separable slide fastener hereinabove dealt with. The separable slide fastener generally designated F'' has a separator Z typically comprising a guide pin member P and a socket pin $B_p$ integral with a socket member B as shown in FIG. 21(f) which are releasably engageable with each other.

Figure 20:
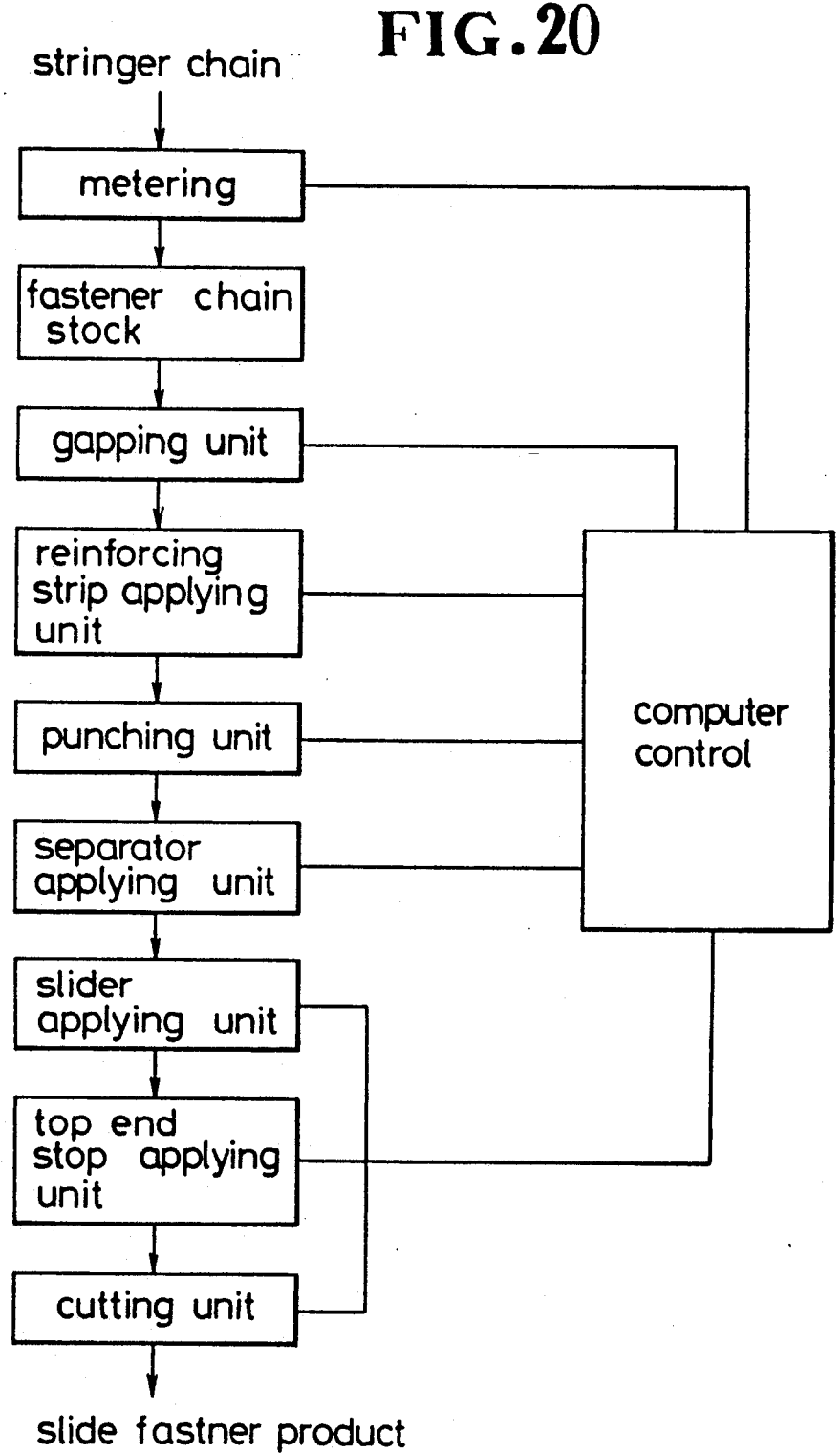
FIG. 20 is a block diagram showing the various stages of parts assembling for a separable slide fastener.

In order to provide the stringer chain F at predetermined intervals with pins P and sockets B of selected forms, color and other characteristics, the production system further incorporates a reinforcing strip applying unit 18, a punching unit 15 and a separator applying unit 101 which are interposed between the gapping unit 11 and the slider applying unit 13 as shown in FIG. 20, wherein the bottom end stop applying unit 12 is excluded as the bottom end stop W' is replaced by the separator Z which likewise functions as a bottom end stop.

The stringer chain F is now provided with a reinforcing strip R at the element-free space portion T' which has been previously formed at the gapping unit 11. The reinforcing strip applying unit 18 includes a strip stocker 88 in the form of a horizontally disposed rectangular box containing a plurality of reinforcing strips $R_1$–$R_6$ differing for instance in form, color, material or other characteristics which are supported in parallel spaced relation to one another.

Figure 22:
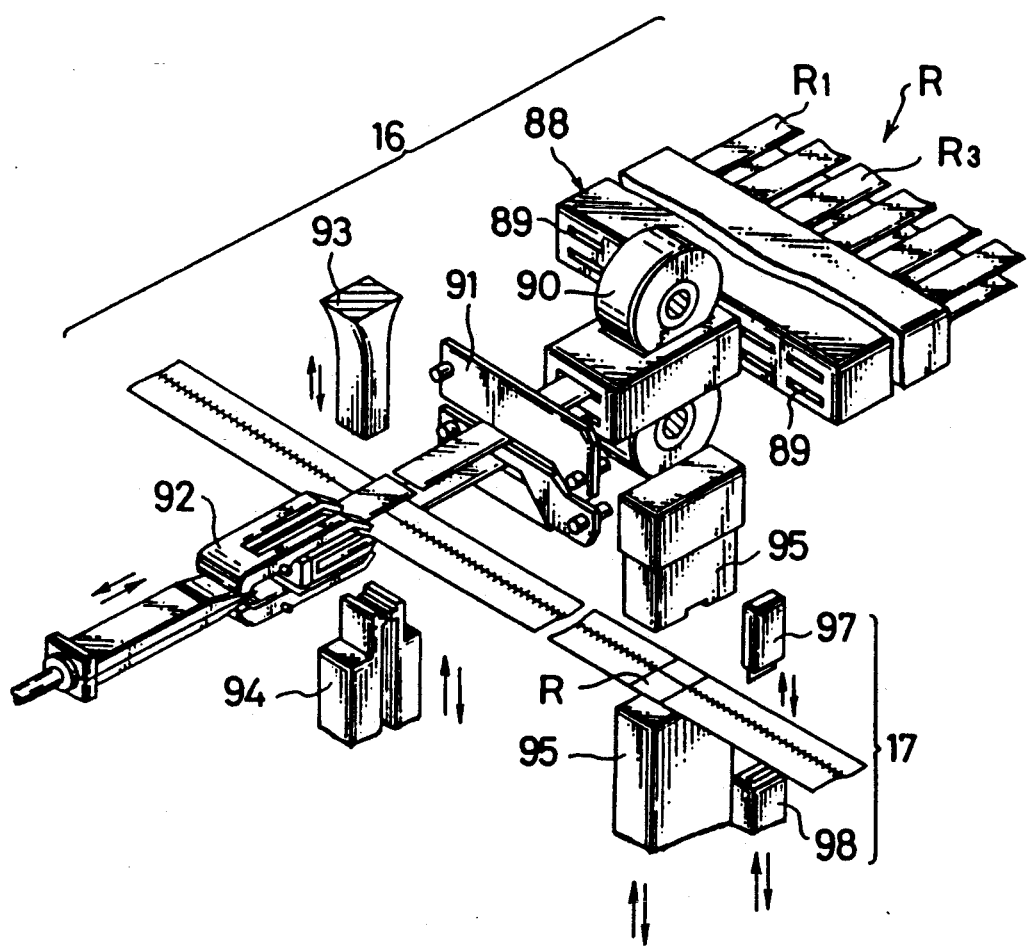
FIG. 22 is a schematic perspective view of an apparatus for applying a reinforcing strip to the stringer chain.
Figure 23A:
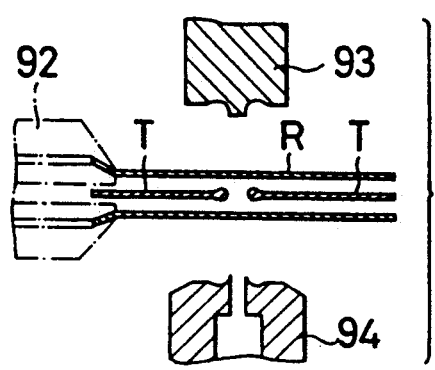
FIGS. 23(a)-23(d) are schematic views utilized to explain the manner of attaching the reinforcing strips to the stringer chain.
Figure 23B:
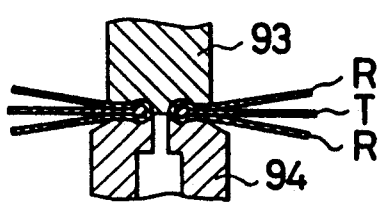
Figure 23C:
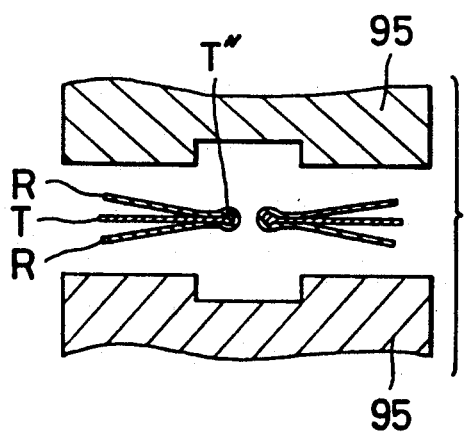
Figure 23D:
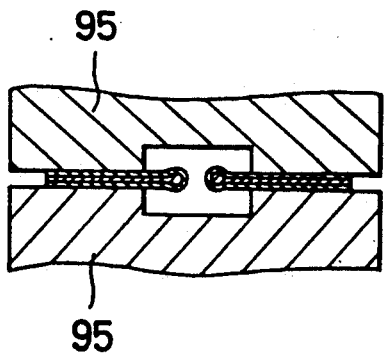

For purposes of illustration, the reinforcing strips R are formed from an elongate plastic material. The strip stocker 88 has a plurality of slits 89 arranged in two rows and directed toward the path of the stringer chain F for feeding therethrough a pair of like reinforcing strips R in superimposed relation. The strip stocker 88 is movable reciprocably by means not shown along a horizontal path parallel with the path of the stringer chain F. The unit 16 further includes a pair of feed rollers 90 for feeding a selected pair of like reinforcing strips R from among the slits 89 in the strip stocker 88 upon arrival thereof at a position instructed as per preset computer program at which the feed rollers 90 register for instance with a pair of slits 89 associated with the corresponding pair of reinforcing strips $R_3$ as shown in FIG. 22. The reinforcing strips $R_3$ are withdrawn a predetermined length from the stocker 88 and thereafter cut by cutters 91. The thus cut pair of strips $R_3$ are gripped by a gripper 92 which is movable reciprocally transversely across the stringer chain F and are brought one above and the other below the chain F at the space portion T'.

The two reinforcing strips $R_3$ thus superposed across the space portion T' of the stringer chain F are attached thereto by fusion with use of a supersonic or high frequency energy applying horn 93 and an anvil 94 both movable vertically toward and away from each other in the path of the stringer chain F as shown in FIGS. 22, 23($a$) and 23($b$), whereupon the material of the strips $R_3$ melts and forms a beaded edge T'' at the space portion T'. The strips $R_3$ are then bonded to the respective stringer tapes T, T with heat and pressure by means of a pair of heaters 95, as shown in FIGS. 21($c$), 22, 23($c$) and 23($d$).

The stringer chain F is then provided at its reinforced portion with a transverse aperture 96 by means of a punch 97 and a die 98 both movable toward and away from each other in the path of the stringer chain F at the punching unit 15 shown in FIG. 22.

Figure 24:
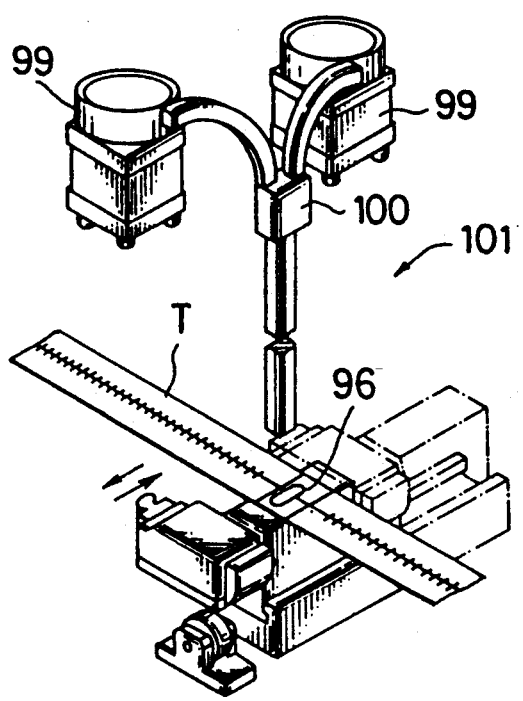
FIG. 24 is a schematic perspective view of an apparatus for applying a pin member of a separator to the stringer chain.
Figure 25:
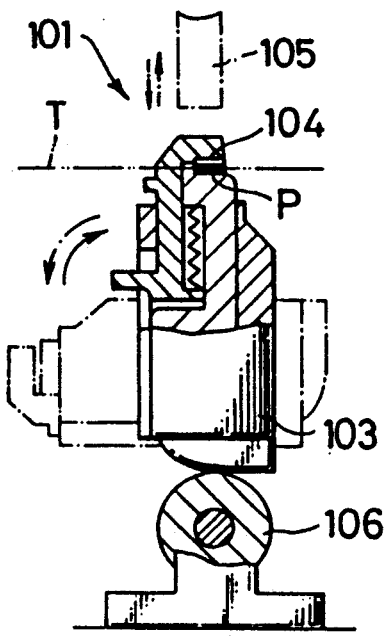
FIG. 25 is a partly sectional elevational view utilized to explain the manner of applying the pin member.
Figure 26:
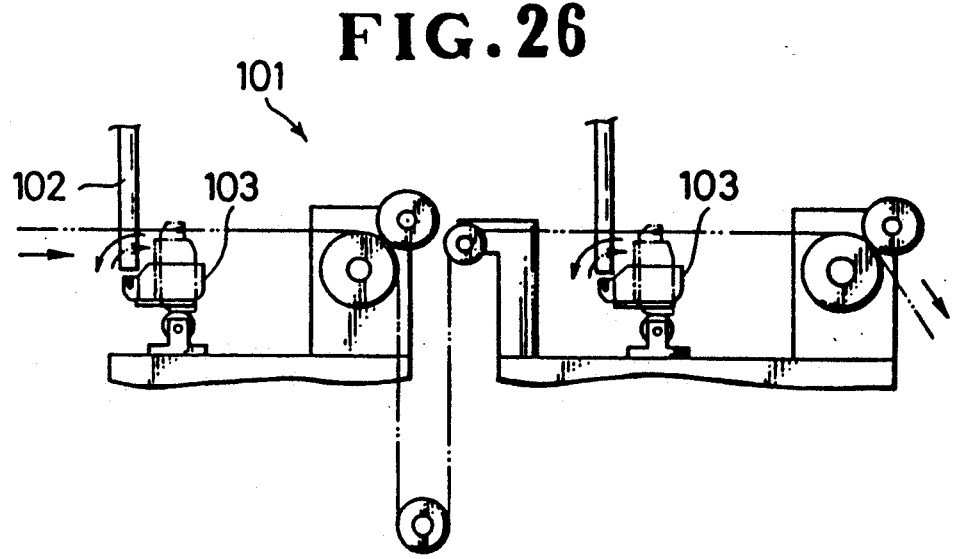
FIG. 26 is a schematic view utilized to explain the manner of applying a socket member of the separator in relation to the pin member.

The stringer chain F is now attached with a guide pin member P and a socket member B having a socket pin $B_p$ at the separator applying unit 101 shown in FIGS. 24, 25 and 26 inclusive. There are provided a plurality of parts feeders 99 which contain guide pins P of for instance different colors tailored to selected characteristics of the stringer chain F. The guide pins P from the respective parts feeders 99 are collectively received at a feed converter 100 which is computer-controlled to feed guide pins P of a particular color to a separator applying means 101 through a vertically disposed chute 102. The separator applying means 101 includes a guide pin holder 103 having a pocket 104 for receiving the guide pin P from the chute 102 and transferring the same onto the stringer chain F. The guide pin holder 103 is rotatable between a horizontal position (indicated by phantom line in FIG. 25) in which the holder 103 receives the guide pin P at its pocket 104 and a vertical position in which the holder 103 transfers the guide pin P onto the stringer chain F as shown in FIG. 25. More specifically, as the holder 103 rotates into the vertical position, the pocket 104 is held in alignment with the path of the stringer chain F so that the guide pin P is inserted through the aperture 96 and thrusted through one of the beaded inner edges T'' of the stringer tapes T, T which have been reinforced with the reinforcing strip R at the space portion T'. The guide pin P is then clamped in place on the stringer chain F by means of a punch 105 cooperating with a cam roller 106 shown in FIG. 25. The stringer chain F having the guide pin P attached to the one inner beaded edge T'' of the stringer tapes T, T is thereafter attached with, a selected socket pin $B_p$ with socket B fed from parts feeder (not shown) similar to the guide pin parts feeders 99, the operation of attaching the socket pin $B_p$ being substantially the same as attaching the guide pin P already described, except that the socket pin $B_p$ is clamped to the other beaded inner edge T'' confronting the guide pin P.

The stringer chain F is thereafter advanced to the slider applying unit 13, the top end stop applying unit 14 and the cutting unit 15 respectively and finished to provide a separable type of slide fastener F'' as shown in FIGS. 21($e$) and 21($f$) which has component parts of harmonious characteristics.

Obviously, various modifications and variations of the present invention are possible in the light of the above teaching. It is therefore to be understood that within the scope of the appended claims the invention may be practiced otherwise than as specifically described.

What is claimed is:

1. An apparatus for manufacturing slide fasteners, comprising:
   (a) a gapping unit comprising a punch and a die anvil for gapping an elongate continuous stringer chain to provide element-free space portions at predetermined intervals therealong;
   (b) a bottom end stop applying unit comprising a first feed means movable back and forth in a direction parallel to the path of travel of said stringer chain and including a plurality of pressure rollers rotatably supported in spaced parallel relation to one another and engageable with a corresponding number of bottom end stop forming flat wire strips, a transfer means including a feed roller engageable selectively with one of said pressure rollers to feed a selected on of said wire strips, a second feed means including a pressure roller and a feed roller for feeding said selected one of said wire strips, and a bottom end attaching means for attaching said selected on of said wire strips to said stringer chain;
   (c) a slider applying unit comprising a slider inventory means including a plurality of slider stockers arranged in spaced parallel relation to one another and releasably holding sliders thereon, a slider transfer means including a slider transfer holder movable transversely across said slider stockers to capture said sliders from a selected one of said slider stockers, and a slider guide means for receiving and transferring said sliders onto a slider holder for applying the sliders to said stringer chain;
   (d) a top end stop applying unit for clamping top end stops onto said stringer chain immediately after said sliders are applied; and
   (e) a cutting unit comprising vertically disposed coacting cutters for cutting said stringer chain across said space portion into individual slide fastener products, al of said operative units being controlled by computer programs to selectively provide fastener component parts compatible with a selected characteristic of a slide fastener product.

2. An apparatus for manufacturing slide fasteners, comprising:
   (a) a gapping unit comprising a punch and a die anvil for gapping an elongate continuous stringer chain to provide element-free space portions at predetermined intervals therealong;

(b) a reinforcing strip applying unit comprising a strip stocker containing a plurality of reinforcing strips, a pair of feed rollers for feeding a selected pair of like reinforcing strips from said strip stocker and means for attaching said selected pair of strips to said stringer chain at said space portion;

(c) a punching unit for providing an aperture in said stringer chain at said reinforcing strip;

(d) a separator applying unit comprising a plurality of parts feeder containing guide pins and sockets with socket pins and a holder rotatable to receive and apply selected ones of said guide pins and said sockets with socket pins respectively to said stringer chain through said aperture;

(e) a slider applying unit comprising a slider inventory means including a plurality of slider stockers arranged in spaced parallel relation to one another and releasably holding sliders thereon, a slider transfer means including a slider transfer holder movable transversely across said slider stockers to capture said sliders from a selected one of said slider stockers, and a slider guide means for receiving and transferring said sliders onto a slider holder for applying the sliders to said stringer chain;

(f) a top end stop applying unit for attaching top end stops onto said stringer chain immediately after said sliders are applied; and (g) a cutting unit comprising vertically disposed coacting cutters for cutting said stringer chain across said space portion into individual slide fastener products, all of said operative units being controlled by computer programs to selectively provide fastener component parts compatible with a selected characteristic of a slide fastener product.

3. A bottom end stop applying unit for applying bottom end stops to slide fasteners, comprising:

(a) a first feed means including a feed table movable back and forth in a direction parallel to the path of travel of said stringer chain and having a plurality of lock grooves and a plurality of pressure rollers coaxially mounted on a shaft in spaced parallel relation to one another and peripherally registering with a corresponding number of wire strips;

(b) a transfer means including a feed roller vertically movable into nipping engagement with a selected one of said pressure rollers;

(c) a reversible motor driving said feed roller in forward and reverse directions;

(d) a table drive means for moving said feed table a predetermined distance intermittently to bring a selected one of said pressure rollers into registry peripherally with said feed roller; and (e) a second feed means including a transfer table having a longitudinal slit, a feed roller and a pressure roller movable toward and away from and engageable with said feed roller across said slit which is disposed in alignment with the periphery of said feed rollers in said transfer means.

4. A bottom end stop applying unit according to claim 3 further comprising a backlash stopper pivotally connected to said feed table and underlying each of said wire strips, said backlash stopper normally biased toward each of said wire strip to prevent the latter from inadvertently moving back.

5. A bottom end stop applying unit according to claim 4 further including a release finger member adapted to rotate said backlash stopper away from said wire strip.

6. A bottom end stop applying unit according to claim 3 further comprising a retainer rod selectively engageable with one of said lock grooves to retain said feed table in position against displacement.

* * * * *